(12) United States Patent
Tingler et al.

(10) Patent No.: US 11,978,014 B2
(45) Date of Patent: *May 7, 2024

(54) DYNAMIC TERMINATION ZONE DETECTION SYSTEM

(71) Applicant: Walmart Apollo, LLC, Bentonville, AR (US)

(72) Inventors: Jeremy Tingler, Bentonville, AR (US); Steven Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/572,998

(22) Filed: Jan. 11, 2022

(65) Prior Publication Data

US 2022/0129838 A1    Apr. 28, 2022

Related U.S. Application Data

(63) Continuation of application No. 16/289,660, filed on Mar. 1, 2019, now Pat. No. 11,232,396.

(Continued)

(51) Int. Cl.
*G06Q 10/087*    (2023.01)
*G06K 7/10*    (2006.01)
(Continued)

(52) U.S. Cl.
CPC ....... *G06Q 10/087* (2013.01); *G06K 7/10366* (2013.01); *G06K 7/10475* (2013.01); *G06Q 20/203* (2013.01); *G08B 13/24* (2013.01)

(58) Field of Classification Search
CPC .. G06Q 10/087; G06Q 20/203; G06Q 20/208; G06K 7/10366; G06K 7/10475;
(Continued)

(56) References Cited

U.S. PATENT DOCUMENTS 7,639,141 B2    12/2009    Elledge
8,421,627 B2    4/2013    Rinkes
(Continued)

FOREIGN PATENT DOCUMENTS

WO    2017066433 A1    4/2017

OTHER PUBLICATIONS

Thrasher, James, "RFID Loss Prevention: What should you expect?", https://blog.atlasrfidstore.com/rfid-loss-prevention-expect, captured Jan. 17, 2018, pp. 1-4.

(Continued)

*Primary Examiner* — Garcia Ade
(74) *Attorney, Agent, or Firm* — Foley IP Law, PLLC

(57) ABSTRACT

Examples provide a tag manager component that identifies a plurality of stationary RFID tags located within a three-dimensional space outside an item display area based on an analysis of RFID tag data associated with the plurality of RFID tag readers. A zone detection component analyzes item data associated with a plurality of items corresponding to the plurality of stationary RFID tags and location data associated with the three-dimensional space using a set of per-item criteria. The set of per-item criteria includes a per-item minimum threshold number of items per unit of three-dimensional space and/or a minimum threshold stationary time-period. A verification component analyzes sensor data and/or transaction data to verify whether the three-dimensional space is a termination zone. If the three-dimensional space is a termination zone, an inventory manager component removes the plurality of items from perpetual inventory.

18 Claims, 12 Drawing Sheets

Related U.S. Application Data

(60) Provisional application No. 62/637,944, filed on Mar. 2, 2018.

(51) Int. Cl.
    *G06Q 20/20*      (2012.01)
    *G07C 9/37*      (2020.01)
    *G08B 13/24*      (2006.01)

(58) Field of Classification Search
    CPC ...... G08B 13/24; G07G 1/0054; G07G 1/009; G07G 1/14
    USPC .......................................................... 705/22
    See application file for complete search history.

(56) References Cited

U.S. PATENT DOCUMENTS

| | | | |
|---|---|---|---|
| 9,165,277 B2 | 10/2015 | Jones et al. | |
| 9,563,793 B2 | 2/2017 | Jones et al. | |
| 9,665,848 B1* | 5/2017 | Johnson | G08B 13/2417 |
| 10,207,868 B1 | 2/2019 | Stubbs et al. | |
| 2008/0001747 A1 | 1/2008 | Kangas | |
| 2008/0308632 A1* | 12/2008 | Fallin | G06Q 10/087 235/385 |
| 2014/0138440 A1* | 5/2014 | D'Ambrosio | G07C 9/37 235/385 |
| 2015/0199890 A1 | 7/2015 | Hewett | |
| 2015/0269818 A1 | 9/2015 | Jain et al. | |
| 2017/0249588 A1* | 8/2017 | Belstner | G06Q 20/203 |
| 2018/0101815 A1* | 4/2018 | Johnson | G06K 19/06037 |
| 2018/0260772 A1 | 9/2018 | Chaubard et al. | |
| 2018/0336516 A1* | 11/2018 | Johnson | G06K 19/0723 |
| 2019/0220816 A1 | 7/2019 | Frye | |
| 2019/0287055 A1 | 9/2019 | Wicks et al. | |

OTHER PUBLICATIONS

Unknown, "Item-Level RFID Tagging and the Intelligent Apparel Supply Chain", Zebra Technologies, copyright 2015, pp. 1-14.
Bhanage et al., "Rollcall: The Design for A Low-Cost and Power Efficient Active RFID Asset Tracking System", 2007, 8 pages.

* cited by examiner

DYNAMIC TERMINATION ZONE DETECTION SYSTEM

BACKGROUND

It is typically beneficial in retail environments to maintain accurate inventory records regarding how many items are currently available in on-hand inventory within the store to inform ordering decisions, as well as to prevent overstocking items, understocking items, and/or item outs (out-of-stock items). However, system inventory, also referred to as perpetual inventory (PI), frequently does not accurately reflect actual numbers of items physically present in the store. This can occur due to invoicing errors, inaccurate item scanning, shrinkage, and so forth.

Radio frequency identification (RFID) tags can be utilized to track items for inventory purposes. An RFID can be attached to one or more physical items in a store. One or more RFID tag readers located within the store gathers the RFID tag data from the RFID tags to determine the location of the RFID tags and the identification of the items associated with each tag. However, RFID tags continue to output RFID tag data even after the tags are removed from their corresponding items. If these detached tags remain within range of one or more RFID tag readers, the PI can continue to show the items present in inventory even though the item is detached from the corresponding RFID tag and removed from the store due to the continued presence of the detached RFID tags. This results in an inaccurate and overstated PI for the corresponding items, which could result in understocking of items, under-ordering or delayed ordering of restock items, as well as occurrence of item outs.

SUMMARY

Some examples provide a system for dynamic termination zone detection for inventory management. The system includes a memory; at least one processor communicatively coupled to the memory; and a plurality of radio frequency identification (RFID) tag readers within an item selection area. A tag manager component identifies a plurality of stationary RFID tags located within a three-dimensional space outside an item display area. The stationary RFID tags are identified based on an analysis of RFID tag data associated with the plurality of RFID tag readers. A zone detection component analyzes item data associated with a plurality of items corresponding to the plurality of stationary RFID tags and location data associated with the three-dimensional space. The zone detection component analyzes the item data and location data using a set of per-item criteria. The zone detection component determines whether the three-dimensional space qualifies as a termination zone based on the analysis result. The set of per-item criteria includes a per-item minimum threshold number of items per unit of three-dimensional space and a minimum threshold stationary time-period. An inventory manager component removes the plurality of items from perpetual inventory associated with the item selection area on condition the three-dimensional space qualifies as the termination zone.

Other examples provide a computer-implemented method for dynamic termination zone detection. A tag manager component analyzes RFID tag data obtained from a plurality of RFID tags associated with a plurality of items within an item selection area. The tag management component identifies a set of RFID tags within the plurality of stationary RFID tags remaining within a predetermined location outside a designated item display area for a minimum threshold stationary time-period. A zone detection component analyzes item data associated with a set of items corresponding to the set of stationary RFID tags with a set of dimensions defining a three-dimensional space associated with the predetermined location. The item data includes dimensions of each item in the set of items. The zone detection component determines whether the three-dimensional space associated with the predetermined location is sufficient to contain the set of items. The zone detection component designates the predetermined location as a termination zone if the number of items in the set of stationary RFID tags exceeds a minimum threshold number of items for the three-dimensional space and the three-dimensional space is insufficient to contain the set of items.

Still other examples provide a system for dynamic termination zone detection. The system includes a memory; at least one processor communicatively coupled to the memory; and a plurality of sensor devices within an item selection area. The plurality of sensor devices includes a plurality of RFID tag readers generating RFID tag data associated with a plurality of stationary RFID tags within an item display area. A zone detection component analyzes historical termination zone data associated with the item selection area, item data associated with a plurality of items assigned to the plurality of stationary RFID tags, and location data associated with the termination zone using a set of per-item criteria. The zone detection component identifies a termination zone based on results of the analysis. The termination zone includes a three-dimensional space located outside an item display area and a plurality of stationary RFID tags. The set of per-item criteria includes a threshold minimum stationary time-period. The historical termination zone data includes item data and location data associated with at least one prior termination zone. An inventory manager component removes the plurality of items from current inventory in real-time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable dynamic identification of radio frequency identification (RFID) tag termination zones for perpetual inventory (PI) update in real-time. In some examples, a zone manager component analyzes RFID tag data from a plurality of RFID tags in an item selection area to identify a set of stationary RFID tags located within a three-dimensional space outside an item display area. This enables identification of aggregations of RFID tags in areas of a store which are not utilized as items display areas, such as side-counters, refrigerated displays, counters, gondola shelves, or other display areas. In other words, the system identifies groupings of RFID tags in non-display areas in real-time.

In other examples, the zone manager component analyzes RFID tag data associated with a set of stationary RFID tags, item data associated with a plurality of items assigned to the set of stationary RFID tags in the item selection area, and location data associated with the three-dimensional space associated with the set of stationary RFID tags to determine whether the items assigned to the set of stationary RFID tags could fit within the three-dimensional space. If not, the system identifies the three-dimensional space as a termination zone and the set of stationary RFID tags as detached tags. The zone manager component removes the set of items associated with the RFID tags in the termination zone from PI. This enables the system to update PI based on termination zones without human intervention.

In still other examples, the zone manager component eliminates items from PI associated with RFID tags in a termination zone dynamically in real-time. This enables more accurate inventory records and reduced error rate in inventory updates. This reduces or eliminates overstated PI without manual scanning of items or other human intervention.

Figure 1:
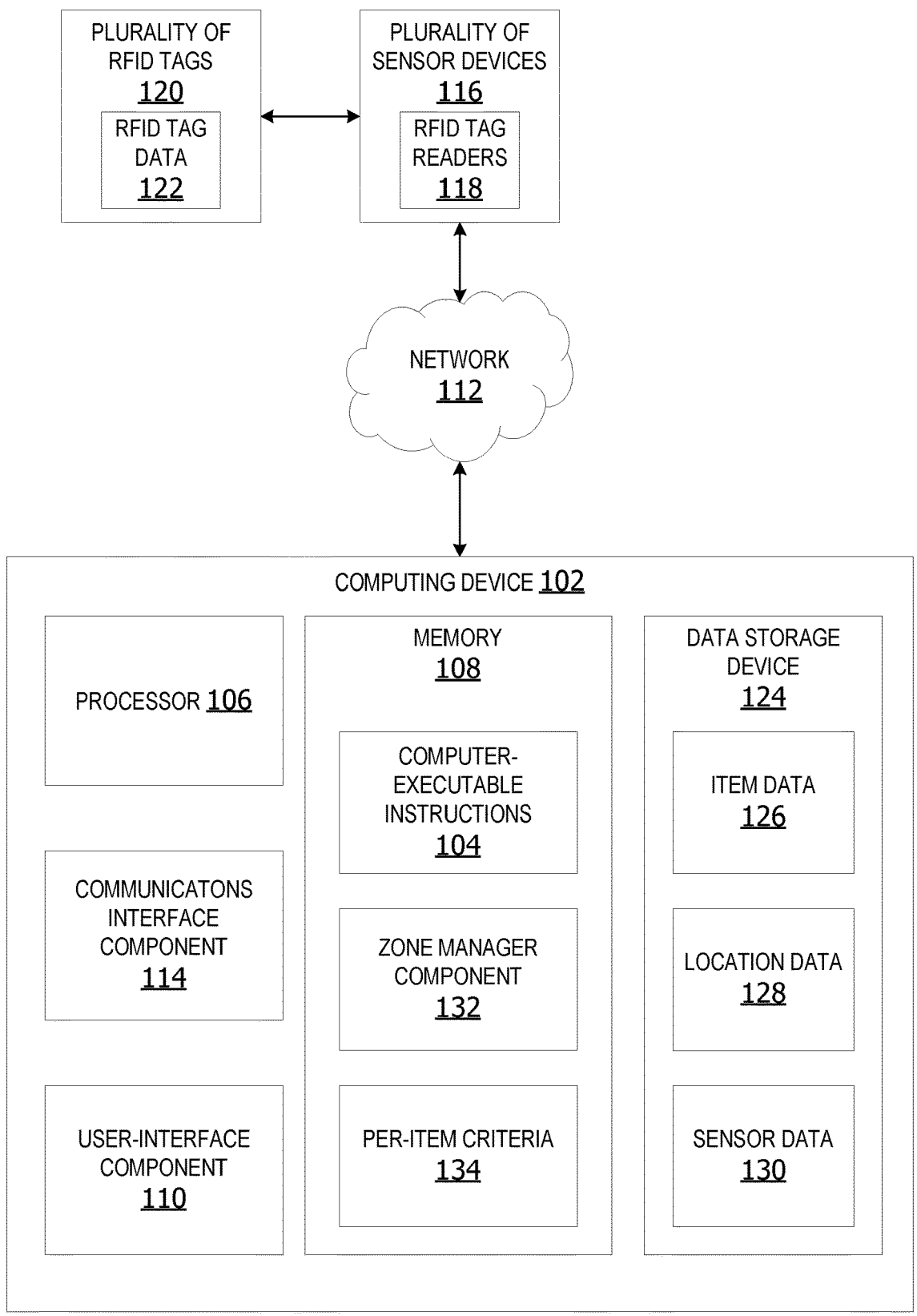
FIG. 1 is an exemplary block diagram illustrating a system for dynamic termination zone detection.

Referring again to FIG. 1, an exemplary block diagram illustrates a system 100 for dynamic termination zone detection. In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 can also optionally include a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 11, FIG. 12 and FIG. 13).

The computing device 102 further has one or more computer readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. For example, the applications can represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in a particular way.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to, a plurality of sensor devices 502, can occur using any protocol or mechanism over any wired or wireless connection. In some examples, the communications interface component 114 is operable with short range communication technologies such as by using near-field communication (NFC) tags.

The plurality of sensor devices 502 includes any type of sensor device, such as, but not limited to, RFID tag readers 118 for generating RFID tag data 122 associated with a plurality of RFID tags 120. The plurality of RFID tags 120 can include passive RFID tags and/or active RFID tags. Each RFID tag identifies a specific item in inventory.

The system 100 can optionally include a data storage device 124 for storing data, such as, but not limited to item data 126, location data 128 and/or sensor data 130. The item data 126 is data associated with one or more items assigned to at least one RFID tag in the plurality of RFID tags. The item data 126 can include an identification of an item, an assigned display area or location for the item, dimensions of the item and/or dimensions of the item packaging, as well as any other data associated with one or more items.

The location data 128 is data associated with a location of the plurality of RFID tags 120. In some examples, the location of one or more RFID tags is determined using RFID tag data from a plurality of RFID tag readers in an array of RFID tag readers throughout the item selection area. The RFID tag readers can include RFID tag readers mounted to the ceiling of the store, walls, shelves, or anywhere else in the item selection area. The system can calculate the coordinates for each RFID tag by triangulating the RFID tag data received from three or more RFID tag readers.

The location data 128 can include an aisle identifier, a shelf identifier, coordinates of a three-dimensional space, dimensions of the three-dimensional space, or any other data associated with a location including a set of RFID tags.

The sensor data 130 is data generated by the plurality of sensor devices 502. The sensor data 130 can include image data generated by image capture devise, pressure sensor data generated by pressure sensors, RFID tag data 122 generated by the one or more RFID tag readers 118, or any other type of sensor data.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database, such as the database 1000 shown in FIG. 10 below.

The data storage device 124 in this example is included within the computing device 102 or associated with the computing device 102. In other examples, the data storage device 124 is a remote data storage accessed by the computing device via the network 112, such as a remote data storage device, a data storage in a remote data center, or a cloud storage.

The memory 108 in some examples stores one or more computer-executable components. Exemplary components include a zone manager component 132. The zone manager component 132, when executed by the processor 106 of the computing device 102, identifies the plurality of RFID tags 120 located within a three-dimensional space outside an item display area. The identified plurality of RFID tags 120 are stationary for a minimum threshold time-period. The zone manager component 132 in some examples identifies the plurality of stationary RFID tags based on an analysis of the RFID tag data 122 generated by the RFID tag readers 118.

In other examples, the zone manager component 132 analyzes the item data 126 associated with the plurality of items corresponding to the plurality of stationary RFID tags and the location data 128 associated with the three-dimensional space containing the plurality of RFID tags 120 using a set of per-item criteria 134 to determine whether the three-dimensional space is an RFID tag termination zone.

The zone manager component 132 in still other examples automatically updates the PI by removing one or more items corresponding to RFID tags within the termination zone from inventory. In other words, the system 100 ignores RFID tags in the termination zone and assumes items assigned to those termination zone RFID tags are no longer physically present within on-hand inventory.

Figure 2:
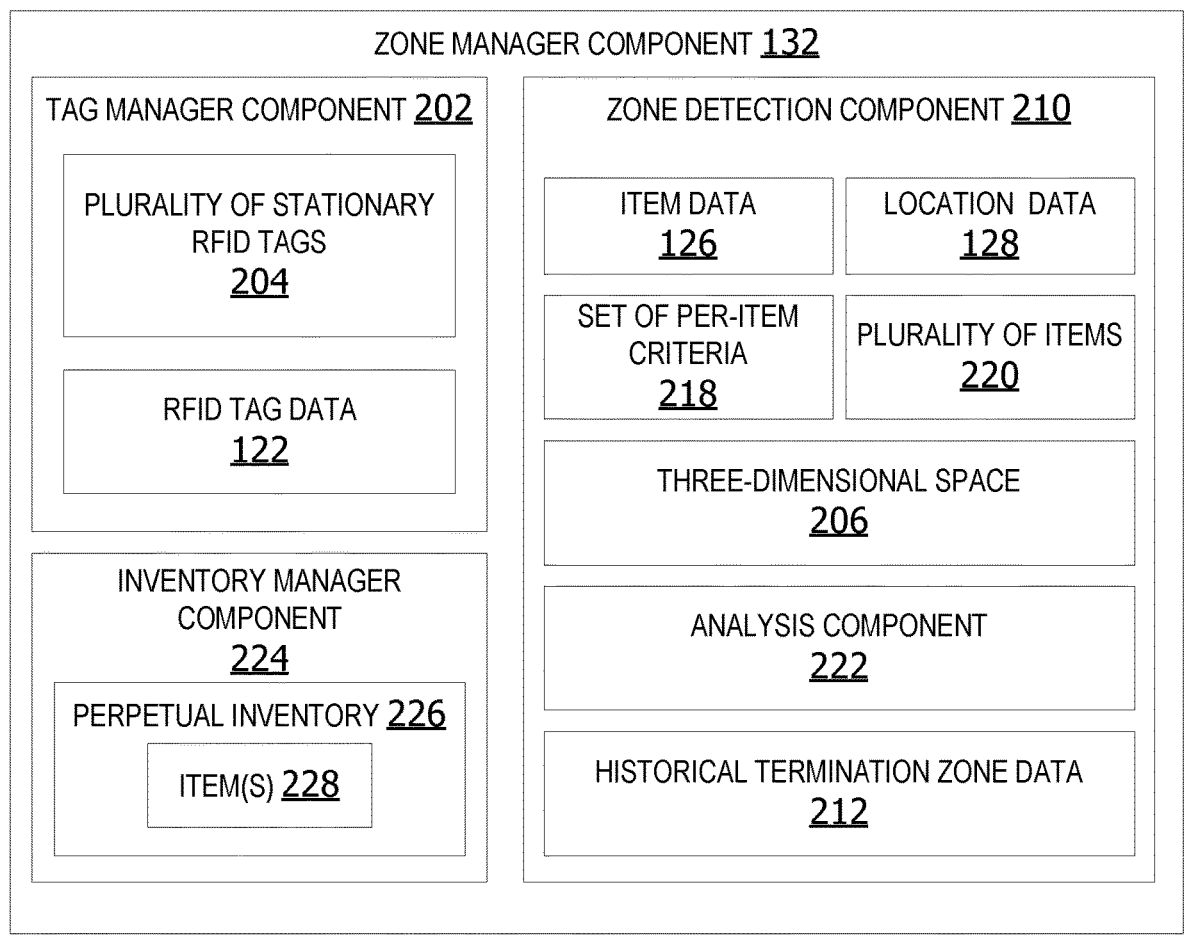
FIG. 2 is an exemplary block diagram illustrating a zone manager component.

FIG. 2 is an exemplary block diagram illustrating a zone manager component 132. The zone manager component 132 can include a tag manager component 202, which identifies a plurality of stationary RFID tags 204 located within a three-dimensional space 206 outside an item display area based on an analysis of RFID tag data 122. The RFID tag data is sensor data generated by a one or more RFID tag readers.

The plurality of stationary RFID tags 204 includes RFID tags which have remained stationary within a fixed three-dimensional space or other predetermined location outside a designated item display area for a threshold minimum stationary time-period. For example, if the minimum threshold stationary time-period is twenty minutes, RFID tags which have remained in a space which is not located in an item display area for at least twenty minutes or longer without being moved are identified as the plurality of stationary RFID tags 204.

A zone detection component 210 determines whether the plurality of stationary RFID tags 204 are located within a termination zone. In some examples, the zone detection component 210 analyzes historical termination zone data 212 associated with an item selection area, item data 214 associated with a plurality of items 220 assigned to the plurality of stationary RFID tags, and location data 128 associated with the three-dimensional space 206 using a set of per-item criteria 218.

The three-dimensional space 206 is an area having dimensions, such as, length, height, and width. The three-dimensional space 206 is located outside an item display area. The item data 126 is data associated with one or more items in the plurality of items 220, such as, but not limited to, the item data 126 in FIG. 1. The item data 126 can include an identification of an item, assigned location or display area for the item, item size, item dimensions, package dimensions, or other item data.

The set of per-item criteria 218 includes criteria for determining whether the three-dimensional space 206 is an RFID tag termination zone, such as, but not limited to, the per-item criteria 134 in FIG. 1. An RFID tag termination zone is an area in which detached RFID tags accumulate. A detached RFID tag is a tag no longer associated with or attached to an item assigned to the RFID tag. In some examples, the set of per-item criteria 218 includes a minimum threshold stationary time-period. The minimum threshold stationary time-period specifies a minimum amount of time one or more RFID tags remain stationary within the three-dimensional space 206 before the three-dimensional space is categorized as a termination zone.

The historical termination zone data 212 includes data associated with one or more previous termination zones. The historical termination zone data 212 can include a previous location of previous termination zone(s), identification of items associated with RFID tags within the previous termination zone(s), size or dimensions of previous termination zone(s), or any other data associated with the previous termination zone(s). The previous termination zone(s) can be compared with the current three-dimensional space 206 and the plurality of items 220 associated with the plurality of stationary RFID tags 204 to determine whether the three-dimensional space is another termination zone.

In another example, historical termination zone data is used to compare locations of previous termination zones with the current location of the RFID tags. Even if the current location is not located at the exact same spot/area as the previous termination zones, the system can determine that the current location of the RFID tags is within a predetermined distance, zone or proximity to one or more previous termination zones. This indicates that even though the termination zone is in a different location, it is still within a reasonable distance from the previous termination zone to enable an inference that the current location is also a termination zone. For example, a trash can may never be located in exactly the same spot, as users sometimes deliberately or accidentally move the trash can from one day to the next day. The trash can may be moved slightly from its previous position or the trash can may be relocated a significant distance from its previous location. However, identifying or analyzing the previous locations of termination zones associated with the trash can enables the system to more accurately identify current and/or future locations of termination zones associated with the trash can.

An analysis component 222 analyzes the item data 126, including the dimensions of the items in the plurality of items, to determine whether the plurality of items 220 fit within the three-dimensional space 206. For example, if the three-dimensional space is one cubic foot and the dimensions of the plurality of items 220 is greater than one cubic foot, the plurality of items 220 could not physically fit within the available three-dimensional space 206. In such case, the RFID tags within the three-dimensional space 206 can be detached from the items assigned to the RFID tags. In other words, the three-dimensional space 206 contains only the RFID tags. The items assigned to the RFID tags are removed from the RFID tags and absent from the three-dimensional space 206.

If the zone detection component 210 determines the plurality of stationary RFID tags 204 within the three-dimensional space 206 are unattached to the plurality of items 220 assigned to those RFID tags, the zone detection component 210 designates the three-dimensional space 206 as an RFID tag termination zone. The zone detection component 210 can designate the three-dimensional space 206 as a termination zone if the dimensions of the three-dimensional space 206 are insufficient to contain or accommodate the plurality of items 220 based on the dimensions of each item in the plurality of items 220 and dimensions of the three-dimensional space 206.

In other examples, the zone detection component 210 designates the three-dimensional space 206 as a termination zone if the number of items in the plurality of stationary RFID tags 204 exceeds a minimum threshold number of items for the dimensions or size of the three-dimensional space and/or if the zone detection component determines the three-dimensional space is too small to contain the set of items.

The inventory manager component 224 removes the plurality of items 220 within the termination zone from the item(s) 228 in perpetual inventory 226. In other words, perpetual inventory 226 is updated by the inventory manager component 224 in real-time to remove items associated with detached RFID tags in the RFID tag termination zone. In this manner, the perpetual inventory 226 is automatically updated to reflect changes in on-hand inventory due to items sold or removed from a store while the detached RFID tags remain within the store. This perpetual inventory 226 update is performed dynamically based on sensor data obtained from RFID tags and other sensor devices without human intervention.

Figure 3:
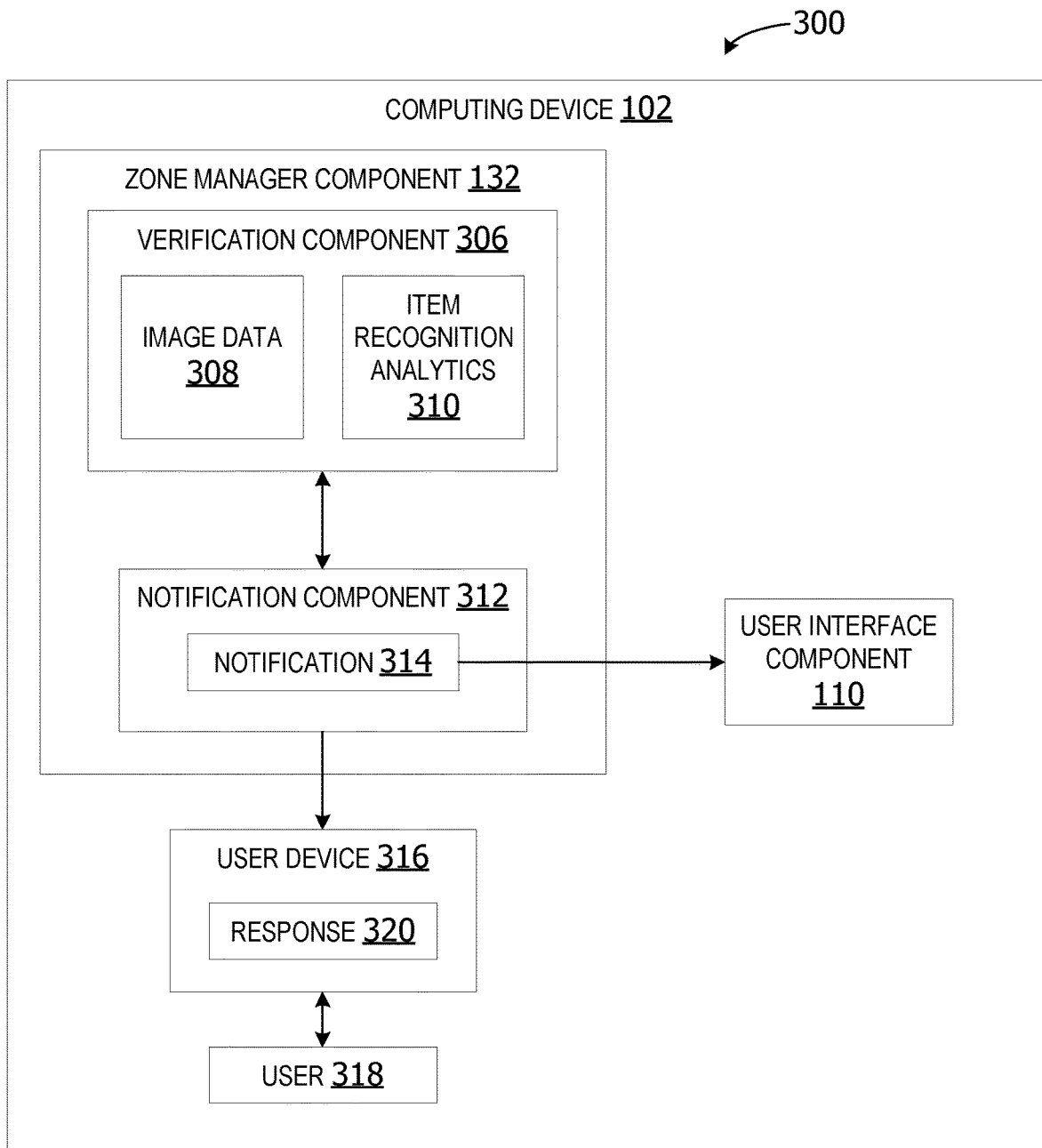
FIG. 3 is an exemplary block diagram illustrating a system for detecting and verifying termination zones.

FIG. 3 is an exemplary block diagram illustrating a system 300 for detecting and verifying termination zones. A computing device 102 executing the zone manager component 132 includes a verification component 306. The verification component 306 analyzes sensor data, such as image data 308, to verify that the RFID tags within the termination zone are not attached to items assigned to the RFID tags. In other words, the verification component 306 analyzes sensor data to verify the items associated with the RFID tags in the termination zone are physically absent from the termination zone.

In some examples, the verification component 306 analyzes image data 308 generated by one or more image capture devices using item recognition analytics 310. The image data 308 includes one or more images of at least a portion of the termination zone. The item recognition analytics include analytics for identifying one or more items based on a label, tag, universal product code (UPC), marker, text, packaging, size, or appearance of at least a portion of the item. In other examples, the image data includes infrared image data generated by one or more infrared sensors.

The image data 308 is generated by a set of one or more image capture devices associated with the three-dimensional space. The image capture device(s) can include one or more devices, such as a sensor device in the set of sensor devices 116 in FIG. 1 and/or the plurality of sensor devices 502 in FIG. 5. The verification component 306 in some examples verifies the termination zone based on an analysis of the image data 308 using the item recognition analytics 310 indicating an absence of the items associated with the RFID tags within the three-dimensional space of the termination zone. In these examples, the zone manager component 132 updates the PI to add the one or more item(s) associated with RFID tags in the termination zone back into the PI if one or more of the items are identified as physically present within the termination zone based on the analysis of the image data 308. If the analysis of the image data 308 confirms the absence of the items in the termination zone, the verification component verifies the termination zone and items associated with RFID tags in the termination zone remain deleted from PI.

A notification component 312 in some examples sends a notification 314 to a user device 316 associated with a user 318. The user 318 in some examples is an associate or other personnel associated with a store or other item selection area. The notification 314, in this example, instructs the user 318 to visually inspect the three-dimensional space associated with the termination zone for a presence of at least one item in the plurality of items associated with RFID tags within the termination zone. In other words, the notification instructs the user to make a visual inspection of the termination zone to determine whether the RFID tags in the termination zone are detached tags (associated items missing)/whether the items associated with the RFID tags in the termination zone are physically present within the termination zone.

If a response 320 is received from the user device 316, the verification component 306 analyzes the response 320 to verify whether the at least one item in the plurality of items associated with the stationary RFID tags is physically present within the termination zone. The response 320 can be referred to as a user response, user input, verification or user confirmation.

The response 320 is a notification from the user 318 indicating a result of the visual inspection. The response 320 can include a confirmation of the absence of the items in the termination zone or an indication of the presence of one or more of the items in the termination zone. In some examples, the verification component 306 verifies a three-dimensional space as a termination zone in response to receiving a confirmation of an absence of the at least one item within the three-dimensional space from the user device 316.

The user device 316 can represent any device executing computer-executable instructions. The user device 316 can be implemented as a mobile computing device, such as, but not limited to, a wearable computing device, a mobile telephone, laptop, tablet, computing pad, netbook, gaming device, and/or any other portable device. The user device 316 includes at least one processor and a memory. The user device 316 can also include a user interface component.

In other examples, the notification 314 is output to the user 318 via a user interface component 110 associated with the computing device 102. The user interface component 110 can include an auditory output device (speaker), a visual output device (display screen), a virtual reality output device, an augmented reality output device, or any other type of output device for notifying the user 318 to make a visual inspection of a termination zone for verification.

In some examples, if the response 320 indicates the presence of at least one item assigned to at least one RFID tag in the termination zone, the zone manager component does not remove the items associated with the stationary RFID tags in the termination zone from the PI. In other examples, if the response 320 indicates the presence of at least one item assigned to at least one RFID tag in the termination zone and the items associated with the RFID tags in the termination zone have already been removed from the PI, the zone manager component updates the PI to add the items associated with the RFID tags in the termination zone back into the PI. This prevents erroneous removal of items from PI which are still physically present in on-hand inventory.

In some examples, the verification component is utilized to verify the location or presence of a termination zone where the items associated with the RFID tag(s) are very small items. For example, if the items associated with the set of RFID tags in a location are small ink cartridges, notebooks, pencils, paperclips, or other small items, verification of the termination zone is performed before removing the items from inventory. The verification can be a manual verification performed by a human user or verification performed based on sensor data generated by one or more sensor devices. In other examples, verification is performed after removal of items from inventory if feedback, user input, sensor data, or other data updates indicate a potential error associated with removal of one or more items from the inventory.

Figure 4:
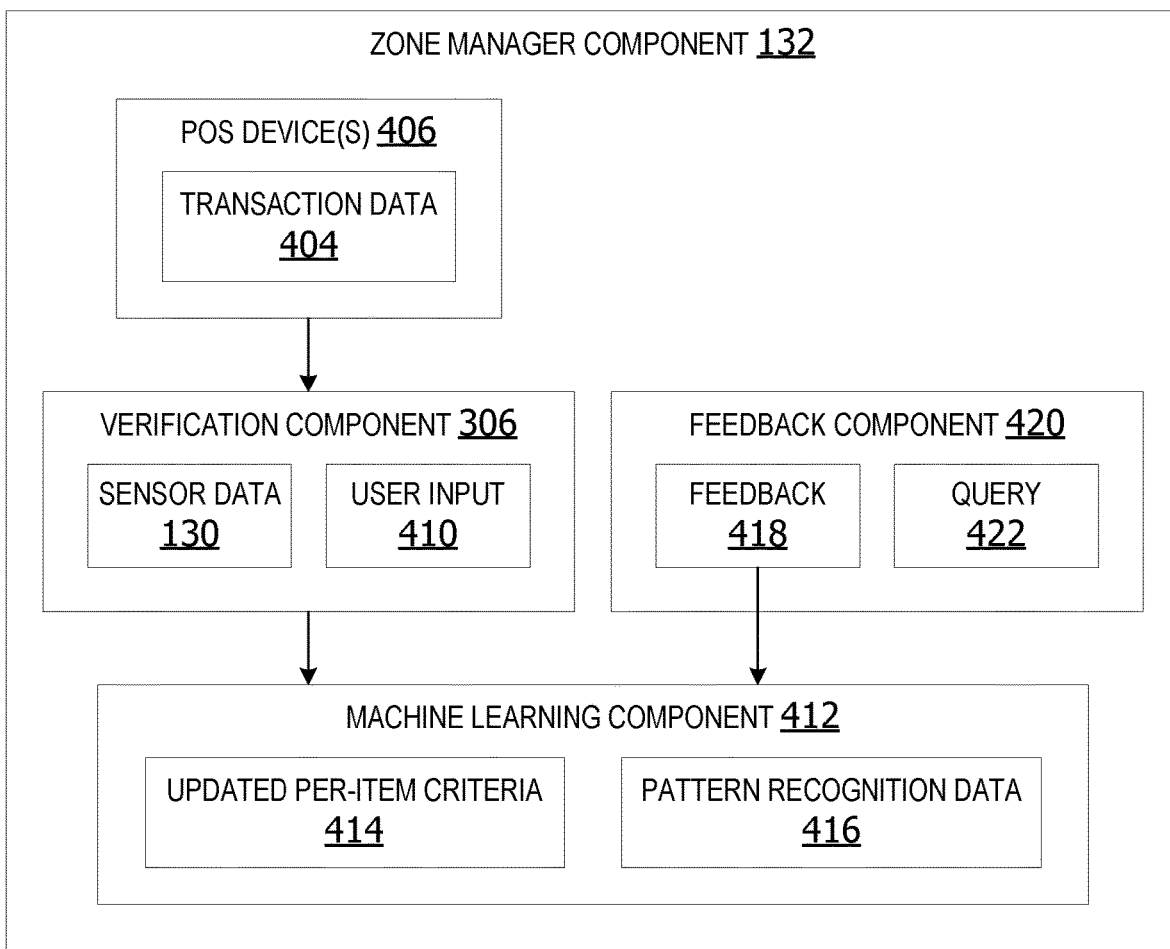
FIG. 4 is an exemplary block diagram illustrating a zone manager component dynamically updating per-item criteria for detecting termination zones.

FIG. 4 is an exemplary block diagram illustrating a zone manager component 132 dynamically updating per-item criteria for detecting termination zones. In some examples, the verification component 306 obtains transaction data 404 from a set of one or more point-of-sale (POS) devices. The transaction data 404 includes data associated with at least one item in the plurality of items associated with RFID tags in a termination zone. The verification component 306 analyzes the transaction data 404 to determine whether at least one item in the plurality of items is associated with a transaction after removal of the item from the PI. In other words, if an item associated with an RFID tag in a termination zone is involved in a transaction, such as a purchase transaction, the items associated with the RFID tags in the termination zone cannot have been physically absent from the store. The verification component 306 re-designates the three-dimensional space associated with the termination zone as a non-termination zone. The plurality of items associated with the stationary RFID tags in the three-dimensional space re-designated as a non-termination zone are added back to the PI.

In other examples, the verification component 306 analyzes sensor data 130 received from a plurality of sensor devices to determine whether any items associated with RFID tags in the termination zone are physically present in the termination zone. The sensor data 130 includes data from one or more sensor devices, such as the set of sensor devices 116 in FIG. 1. The sensor data 130 can include, without limitation, image data generated by an image capture device (camera), scan data generated by a scanner device, weight sensor data generated by a weight sensor, pressure data generated by a pressure sensor data, or any other type of data. The scan data can include data generated by scanning a UPC, a barcode, a matrix barcode, or any other type of item identifier.

The verification component 306 in other examples analyzes user input received from one or more user devices indicating whether one or more items associated with RFID tags in the termination zone are physically present in the termination zone. The user input 410 can include input received from a user device, such as the response 320 in FIG. 3.

A machine learning component 412 analyzes feedback 418, transaction data 404, and sensor data 130, including scan data, using pattern recognition data 416 to generate updated per-item criteria 414 in real-time. The updated per-item criteria 414 includes criteria such as, but not limited to, the per-item criteria 134 in FIG. 1 and/or the set of per-item criteria 218 in FIG. 2.

The feedback 418 in some examples is feedback received from one or more user devices associated with one or more users. The feedback can indicate whether items removed from PI based on identification of termination zones was accurate. The feedback can also indicate whether an area identified as a termination zone is correct or erroneously identified as a termination zone.

For example, if feedback indicates that a termination zone was actually an abandoned cart containing items which were erroneously removed from inventory before the items were removed from the cart and restocked, the machine learning component 412 can increase the minimum threshold stationary time-period to allow greater time for items to be found and restocked prior to designating the location of those items as a termination zone.

In another example, if an area outside an item display space is consistently verified as a termination zone, the machine learning component 412 decreases the minimum threshold stationary time-period for designating the area as a termination zone and/or decreases the minimum number of items required to accumulate within the location before the location is designated (identified) as a termination zone.

The feedback 418 is obtained by a feedback component 420. In some examples, the feedback component 420 sends query 422 to one or more user devices requesting feedback regarding updates to PI and/or designation of one or more areas as a termination zone.

Figure 5:
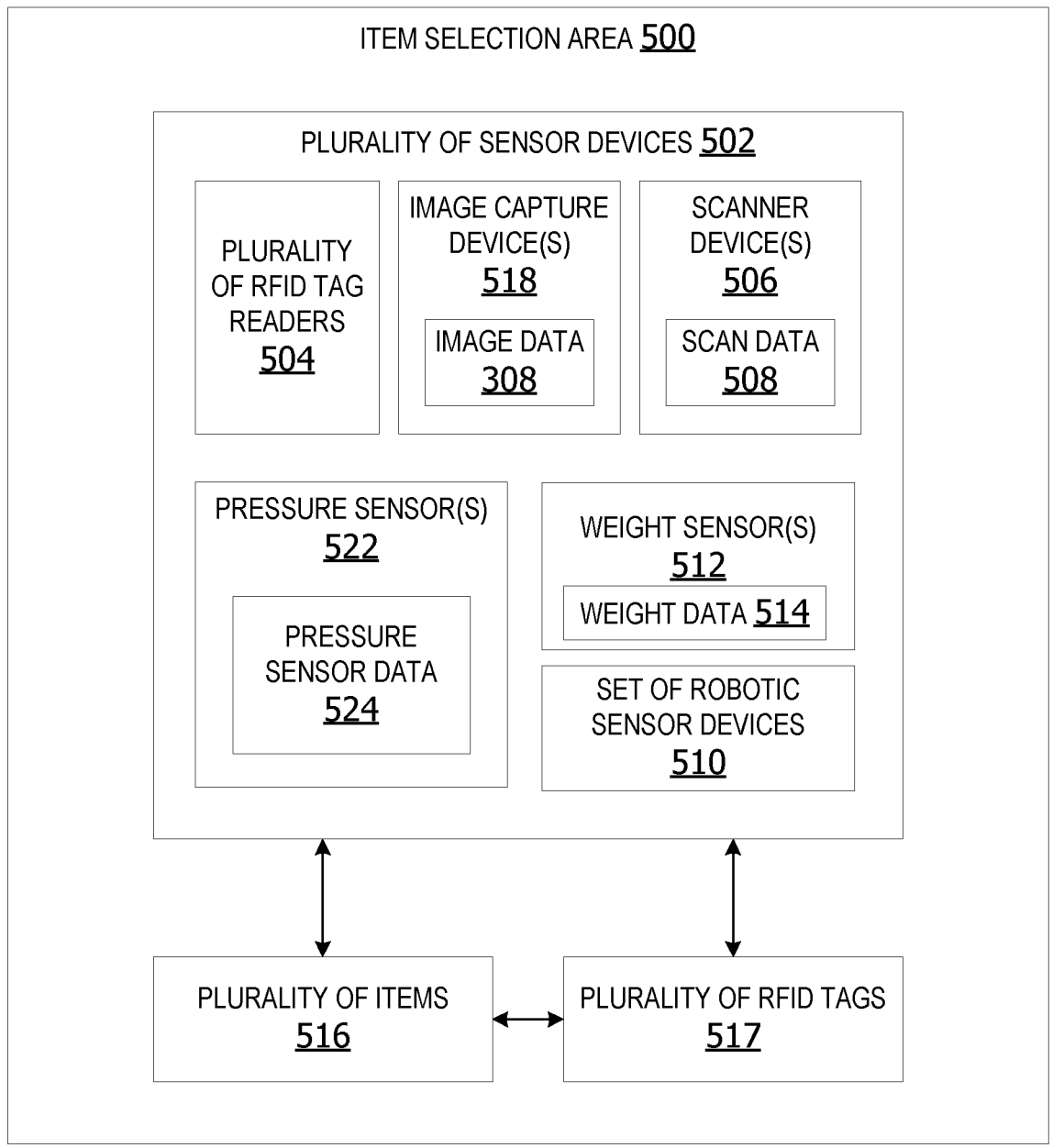
FIG. 5 is an exemplary block diagram illustrating an item selection area including a plurality of sensor devices.

FIG. 5 is an exemplary block diagram illustrating an item selection area 500 including a plurality of sensor devices 502. The item selection area 500 is an area including a plurality of items associated with one or more display areas. The display areas can include shelves, side-counters, end-cap displays, refrigerated displays, freezer compartments, gondola shelves, bins, or any other item display. The item selection area 500 can include an interior portion of a store, an exterior portion of a store, and/or any other retail environment.

The plurality of sensor devices 502 includes one or more sensor devices within the item selection area for generating sensor data associated with one or more items in the plurality of items. The plurality of sensor devises 116 can include a plurality of RFID tag readers 504 for generating RFID tag data, such as, but not limited to, the RFID tag readers 118 in FIG. 1. The plurality of RFID tag readers 504 obtain RFID tag data from a plurality of RFID tags 120 associated with a plurality of items 516.

Scanner device(s) 506 include one or more scanner devices for generating scan data 508. The scanner device(s) 506 can include a barcode reader, a UPC code reader, a matrix barcode reader, quick response (QR) code reader, or any other type of scanner.

The plurality of sensor devices 502 optionally includes a set of robotic sensor devices 510. A robotic sensor device is an autonomous sensor device capable of moving through the item selection area and scanning items in the plurality of items. A robotic sensor device can be self-propelled, including a motor, a guidance system and/or sensor for guiding the robotic sensor device.

The plurality of sensor devices 502 optionally includes weight sensor(s) 512 for generating weight data 514 associated with the plurality of items 516, image capture device(s) 518 generating image data 308 associated with the plurality of items 516, and/or pressure sensor(s) 522 generating pressure sensor data 524 associated with the plurality of items 516.

In some examples, the zone detection component re-designates a termination zone as a non-termination zone if the sensor data generated by the plurality of sensors 116 indicates that at least one item associated with at least one RFID tag within the termination zone is physically present within the item selection area.

In other examples, the verification component verifies a location is a termination zone based on an analysis of the sensor data obtained from the plurality of sensor devices 502. If the termination zone is verified, the items associated with RFID tags in the termination zone are removed from the PI.

Figure 6:
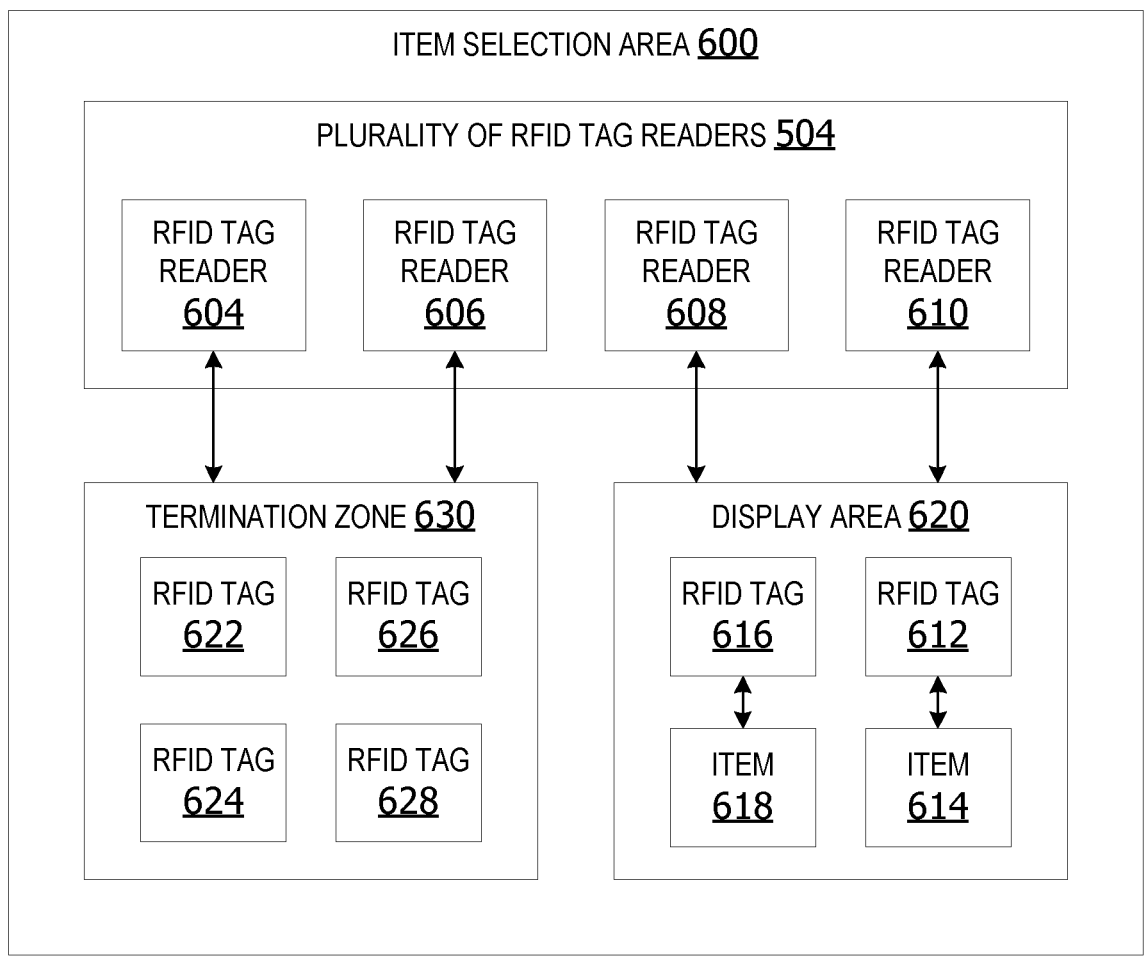
FIG. 6 is an exemplary block diagram illustrating an item selection area including a plurality of radio frequency identification (RFID) tag readers.

FIG. 6 is an exemplary block diagram illustrating an item selection area 600 including a plurality of RFID tag readers 504. The plurality of RFID tag readers 504 in this non-limiting example includes RFID tag reader 604, RFID tag reader 606, RFID tag reader 608 and RFID tag reader 610. In other examples, the plurality of RFID tag readers 504 can include two RFID tag readers, three RFID tag readers, as well as five or more RFID tag readers.

The RFID tag readers obtain RFID tag data from one or more RFID tags within the item selection area 600. In this example, the RFID tags include RFID tag 612 associated with item 614 and RFID tag 616 associated with item 618 within an item display area 620.

The RFID tags also include RFID tag 622, RFID tag 624, RFID tag 626 and RFID tag 628 within termination zone 630. The RFID tags within the termination zone include a threshold number of RFID tags which have remained stationary for a threshold minimum time-period outside the item display area 620. The RFID tags within the termination zone 630 are RFID tags detached from the items assigned to those RFID tags. In other words, the RFID tag 622 is detached from the item assigned to the RFID tag 622. For example, if the RFID tag 622 is a tag assigned to a baby onesie, the RFID tag 622 is separated from the baby onesie.

Figure 7:
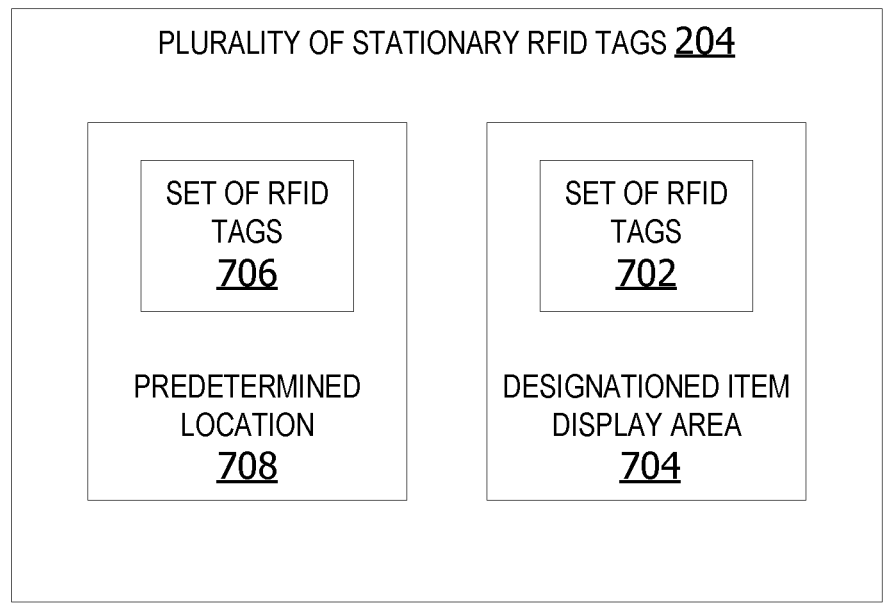
FIG. 7 is an exemplary block diagram illustrating a plurality of stationary RFID tags.

FIG. 7 is an exemplary block diagram illustrating a plurality of stationary RFID tags 204. The plurality of stationary RFID tags 204 includes a set of RFID tags 702 in a designated item display area 704, such as, but not limited to, the display area 620 in FIG. 6. The set of RFID tags 706 is a set of two or more stationary RFID tags located within a predetermined location 708, such as, but not limited to, the termination zone 630 in FIG. 6.

Figure 8:
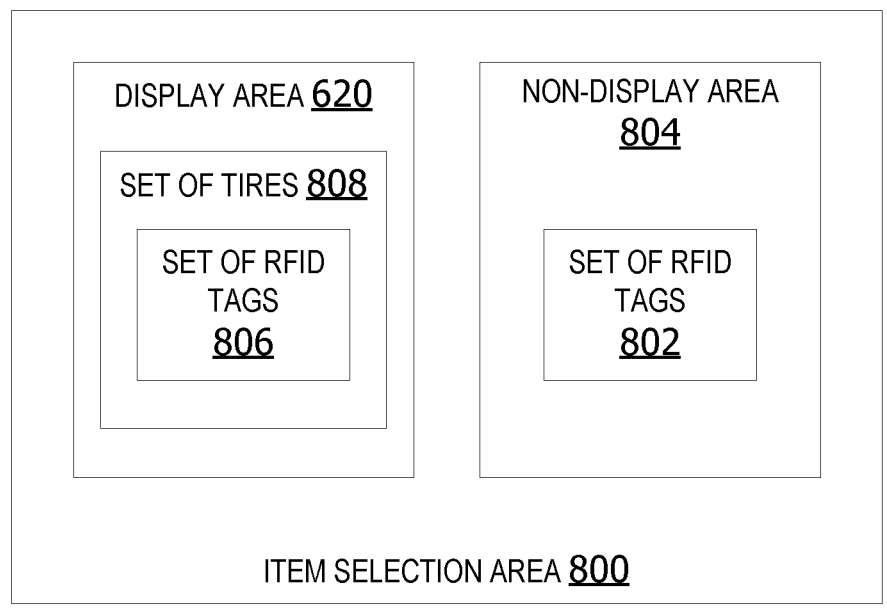
FIG. 8 is an exemplary block diagram illustrating an item selection area including a set of RFID tags in a non-display area.

FIG. 8 is an exemplary block diagram illustrating an item selection area 800 including a set of RFID tags 802 in a non-display area 804, such as, but not limited to, the termination zone 630 in FIG. 6 and/or the predetermined location 708 in FIG. 7. The non-display area 804 is an area that is not assigned to display of an item assigned to any RFID tag in the set of RFID tags 802. For example, if the set of RFID tags 802 are tags assigned to tires, the non-display area 804 is an area which is not assigned to display or store tires. The non-display area can include a space inside a trash can, an area on an open floor space, an area in an aisle, an area under a shelf, an area inside an empty bin or other container, etc. The set of RFID tags 802 may not be attached to the items associated with the set of RFID tags 802.

The set of RFID tags 806 is a set of one or more RFID tags associated with one or more items in a display area 620. The display area 620 is an area assigned to display and/or storage of one or more items assigned to the set of RFID tags 806. In this example, the set of RFID tags 806 include tags assigned to a set of one or more items, such as the set of one or more tires 808. Thus, each tag in the set of RFID tags 806 is attached or otherwise associated with a tire in the set of tires. The display area 620 includes any area assigned to store, hold, display, stack, or otherwise contain one or more tires in the set of tires 808. A display area can include any area in which items are assigned. A display area can be an item storage area, a check-out area, an item return area, dressing room, customer service area, a shelf display, a clearance bin or cart, or any other area designated for storage or display of items.

In one example, if the non-display area 804 is a three-dimensional space that is one cubic foot and dimensions of a single tire is greater than the one cubic foot space of the non-display area 804, the system assumes that the set of RFID tags 802 located within the non-display area and assigned to tires which are too large to fit within the non-display area 804 are detached or otherwise separated from the tires. In other words, if the non-display area 804 is too small to contain the tires assigned to the set of RFID tags 802, the set of RFID tags 802 are detached tags removed from the tires.

In one example, the non-display area 804 is an interior space of a trash can or other waste receptacle. As each tire in the set of tires 808 is sold or installed on a vehicle, the RFID tag for that tire is removed and placed into the non-display area 804. The system monitors the accumulation of the RFID tags in the non-display area. When the number of tags in the non-display area surpasses a threshold number of RFID tags and the tags remain stationary in the non-display area for a threshold time-period, the non-display area 804 is identified as a termination zone and the items associated with the set of RFID tags 802 are removed from inventory.

In the example shown in FIG. 8, the RFID tags are assigned to tires. However, the examples are not limited to using RFID tags attached to tires. The system in other examples uses RFID tag data associated with items other than tires.

Figure 9:
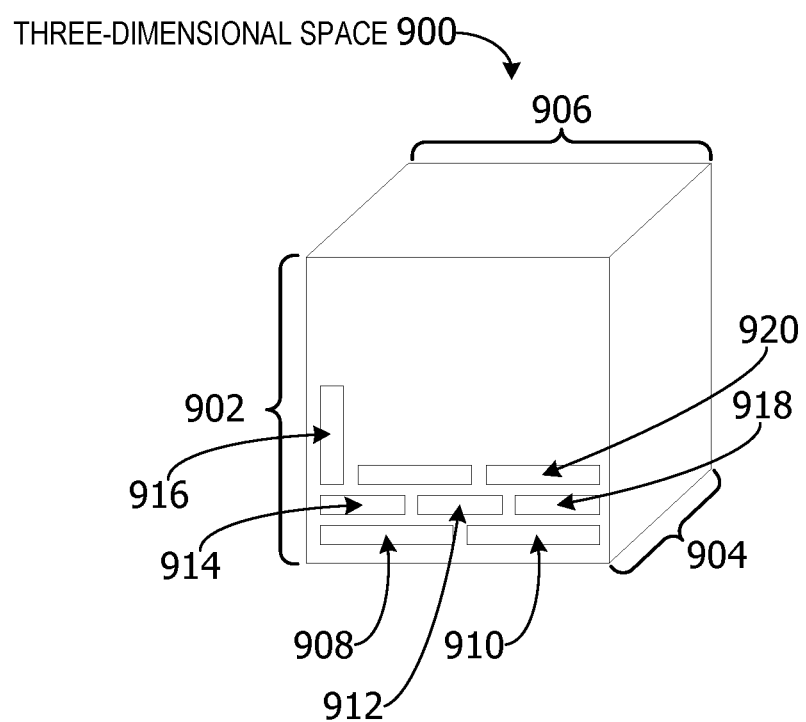
FIG. 9 is an exemplary block diagram illustrating a three-dimensional space including a plurality of stationary RFID tags.

FIG. 9 is an exemplary block diagram illustrating a three-dimensional space 900 including a plurality of stationary RFID tags. The three-dimensional space is a space, such as, but not limited to, the three-dimensional space 206 in FIG. 2.

The three-dimensional space 900 includes a height 902, a length 904 and a width 906. The three-dimensional space encloses RFID tags, such as, but not limited to, RFID tag 908, RFID tag 910, RFID tag 912, RFID tag 914, RFID tag 916, RFID tag 918 and RFID tag 920. In this example, the three-dimensional space is a cube-shape. However, in other examples, the three-dimensional shape includes a cylindrical shape, a rectangular shape, a pyramid shape, a spherical shape, an irregular shape, or any other shape.

Figure 10:
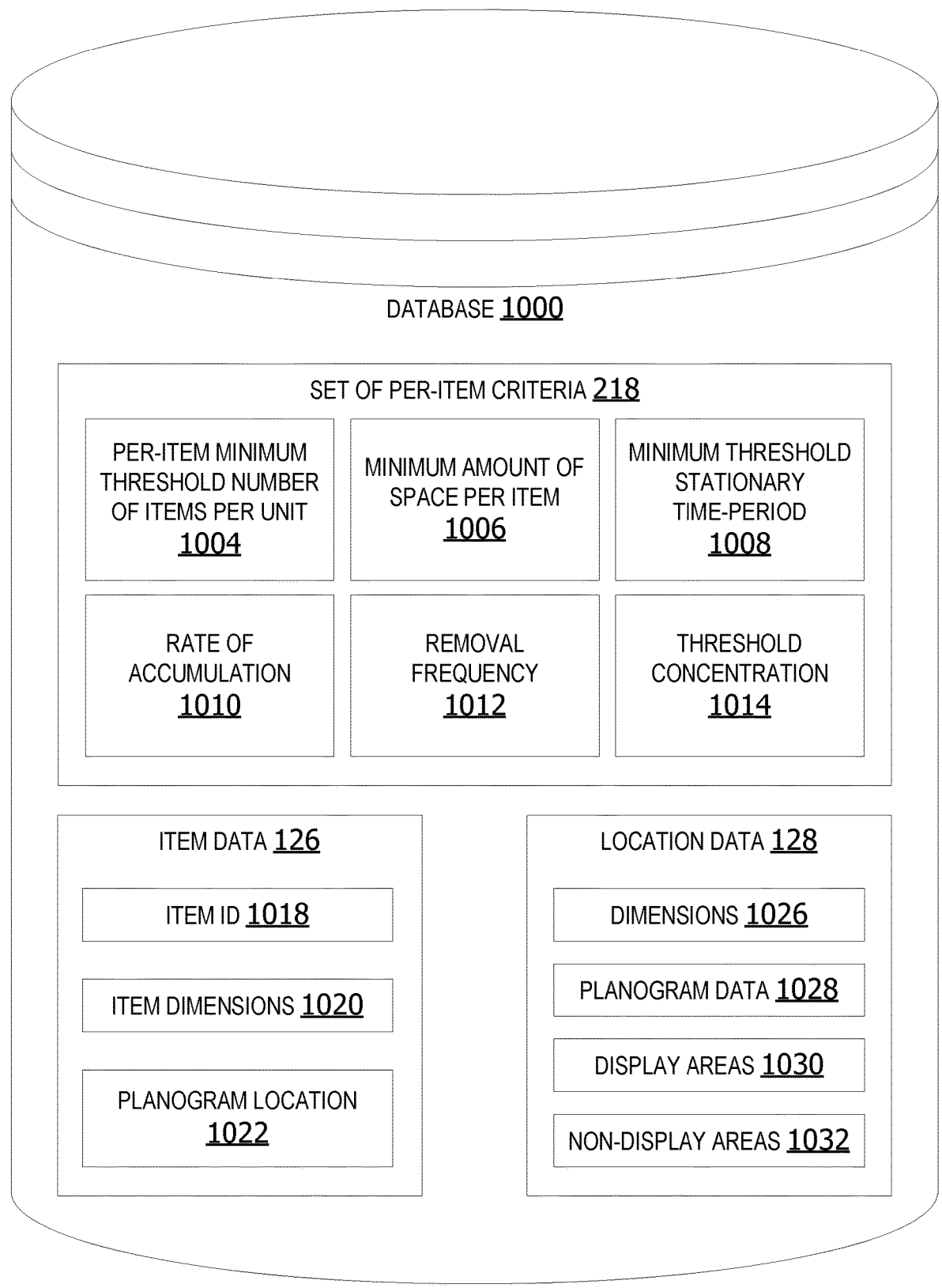
FIG. 10 is an exemplary block diagram illustrating a database.

FIG. 10 is an exemplary block diagram illustrating a database 1000 storing data. The database 1000 can be stored on storage device, such as, but not limited to, the data storage device 124 in FIG. 1.

The database 1000 can include a set of per-item criteria 218. The set of per-item criteria 218 are customized for each type of item. In other words, the criteria applied to a pair of shoes can be different than the criteria applied to a digital video disk (DVD).

The set of per-item criteria 218 can include, without limitation, a per-item minimum threshold number of items per unit 1004 of space. For example, a criterium can specify a minimum of two tires per five cubic foot non-display space and a minimum of ten packages of socks per one cubic foot non-display space prior to designating the space as a termination zone. In another example, the criteria specifies that a group of ten or fewer RFID tags should be ignored/disregarded.

The set of per-item criteria 218 can include a minimum amount of space per item 1006. The minimum amount of space specifies an amount of space which would be too small to contain an item. The minimum amount of space for an ink cartridge can be a cubic inch while the minimum amount of space for a tire can be two or three cubic feet.

The set of per-item criteria 218 in some examples includes a minimum threshold stationary time-period 1008. The minimum threshold stationary time-period 1008 indicates the minimum amount of time that one or more RFID tags remain motionless in a location before that location can be considered a termination zone. For example, if the threshold stationary time is twenty minutes and a set of RFID tags are only stationary for five minutes before resuming motion, the system can determine that the RFID tags are associated with items in a cart and not a termination zone. This prevents the system from removing items in a user's shopping cart or items being collected together for restocking from inventory prematurely.

The set of per-item criteria 218 can optionally include a rate of accumulation 1010 of RFID tags in the non-display area. For example, if RFID tags are added to the non-display space at regular intervals or if numerous RFID tags are added to the space simultaneously this rate of accumulation can be utilized to determine if the tags are detached tags and/or determine whether the location is an RFID termination zone.

The set of per-item criteria 218 in other examples includes a removal frequency 1012. The removal frequency indicates how frequently and/or when the RFID tags are removed from the non-display area and/or taken out of the range of the RFID tag readers. In an example, if the non-display area is a trash receptacle accumulating RFID tags as they are removed from tires installed on vehicles or otherwise sold to customers, the removal frequency is be utilized to determine whether the RFID tags removal from the non-display area and/or the item selection area coincides with emptying of the trash receptacle and/or trash pick-up.

The set of per-item criteria 218 can also include a threshold concentration 1014. The threshold concentration 1014 is a density or number of RFID tags associated with a given item within a given amount of space. The non-display space can be designated as a termination zone when the concentration or density of RFID tags associated with one or more items reaches the threshold concentration for a predetermined amount of space.

The per-item criteria 218 is not limited to the criteria shown in FIG. 10. The per-item criteria 218 can include criteria for homogeneous RFID tags or heterogenous RFID tags. In an example, the per-item criteria 218 includes a criterion indicating that if a heterogenous collection of RFID tags associated with a variety of different items not typically located together in the same area, it indicates the RFID tags are detached tags in a termination zone.

In another example, the per-item criteria 218 indicates whether a threshold number of homogenous RFID tags associated with the same type of item are found together in the same location. If the threshold number of homogenous RFID tags are found together within a given three-dimensional space, it indicates the space is a termination zone.

In still another example, the per-item criteria includes a time and/or date criterion. For example, if five RFID tags aggregate during a time-period when no restocking is schedule, that can be sufficient for identifying the area as a termination zone. However, during a restocking period, five RFID tags aggregated together may be insufficient for identifying a termination zone due to the risk of mistakenly identifying items being restocked as RFID tags in a termination zone. Thus, the criteria for identifying a termination zone can vary/change based on the time of day, day of the week, season, work schedules, etc.

The database 1000 can also include item data 126. The item data 126 includes data associated with one or more items. The item data 126 can include an item identification (ID) 1018, item dimensions 1020 and/or planogram 1022. A planogram 1022 identifies placement/location of items within an item selection area. The planogram 1022 can define where items are placed and quantifies of items in each location.

Location data 128 can optionally be stored in database 1000. The location data 128 can include dimensions 1026 of a location or three-dimensional space, planogram data 1028 associated with a location or area surrounding the location, identification of display areas 1030 and/or identification of non-display areas 1032. The display areas 1030 include one or more areas, such as, but not limited to, the display area 620 in FIG. 6 and FIG. 8 and/or the designated item display area 704 in FIG. 7. The non-display areas 1032 include one or more areas where item displays are absent, such as, but not limited to, the non-display area 804 in FIG. 8.

Figure 11:
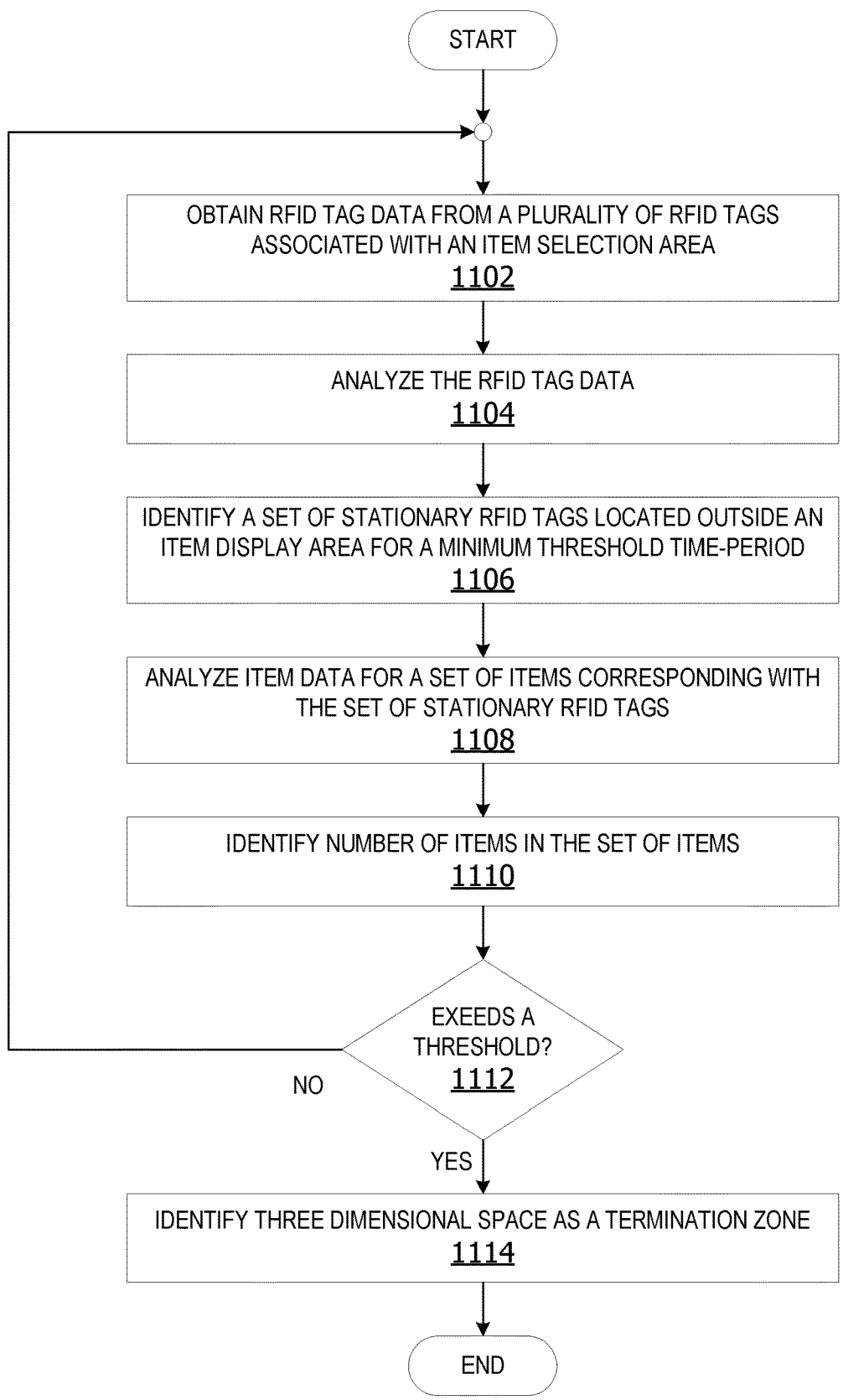
FIG. 11 is an exemplary flow chart illustrating operation of the computing device to identify a termination zone.

FIG. 11 is an exemplary flow chart illustrating operation of the computing device to identify a termination zone. The process shown in FIG. 11 can be performed by a zone manager component, executing on a computing device, such as the computing device 102 in FIG. 1 or the computing device 302 in FIG. 3.

The process begins by obtaining RFID tag data from a plurality of RFID tags associated with an item selection area at 1102. The RFID tag data is data such as RFID tag data 122 in FIG. 1 and FIG. 2. A tag manager component analyzes the RFID tag data at 1104. The tag manager component is a component for identifying stationary RFID tags, such as, but not limited to, the tag manager component 202 in FIG. 2. The tag manager component identifies a set of stationary RFID tags located outside an item display area for a minimum threshold time-period at 1106.

A zone detection component analyzes item data for a set of items corresponding with the set of stationary RFID tags at 1108. The zone detection component is a component for identifying RFID tag termination zones, such as, but not limited to, the zone detection component 210 in FIG. 2. The zone detection component identifies the number of item in the set of items at 1110. The zone detection component determines if the number of items exceeds a threshold at 1112. If no, the process returns to operation 1102. The zone manager component iteratively executes operations 1102 through 1112 until the number of items in a set of items exceeds a threshold number of items at 1112. The zone detection component identifies the three-dimensional space associated with the set of stationary RFID tags as a termination zone at 1114. The process terminates thereafter.

While the operations illustrated in FIG. 11 are performed by a computing device, aspects of the disclosure contemplate performance of the operations by other entities. In an example, a cloud service performs one or more of the operations.

Figure 12:
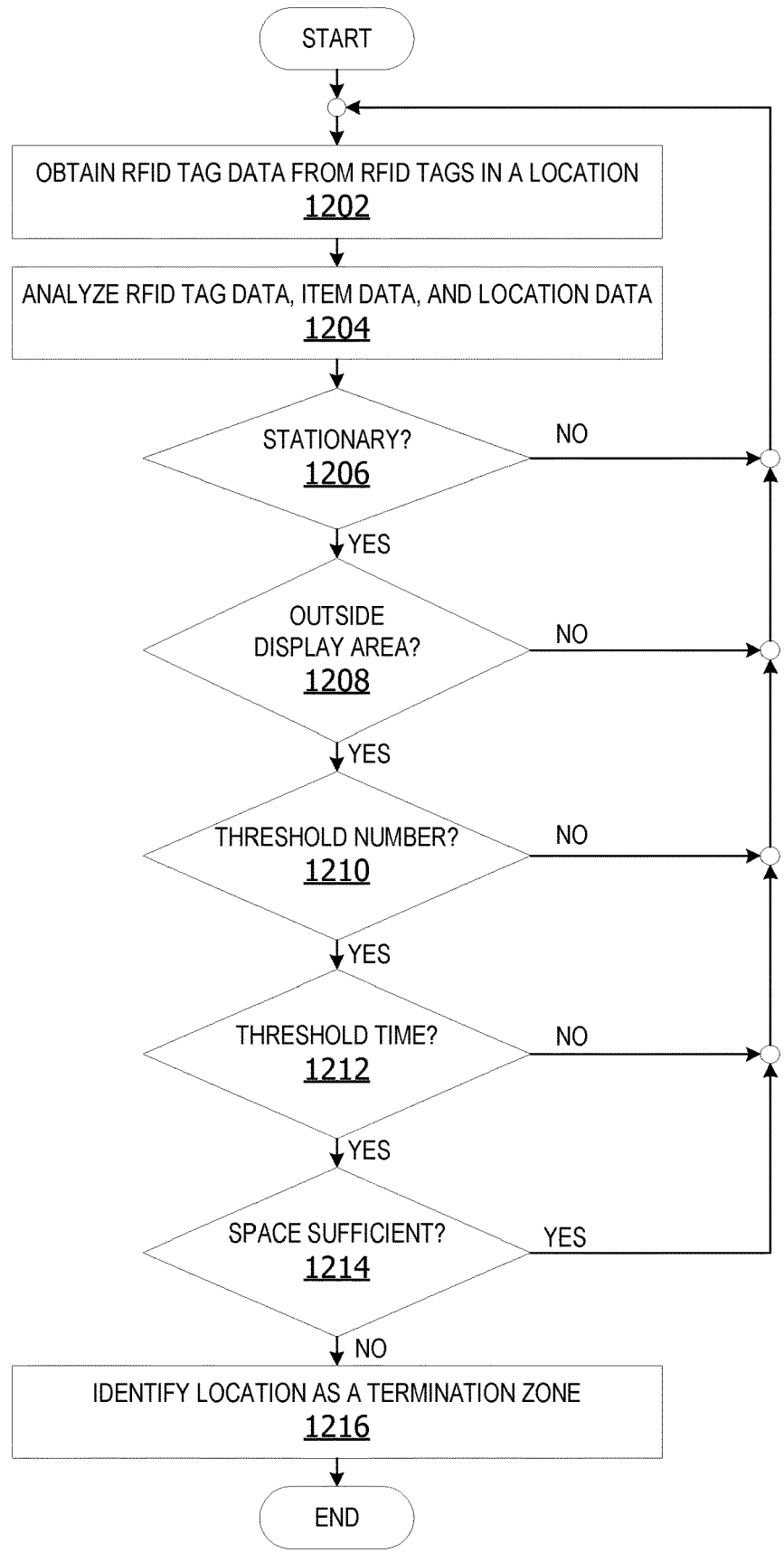
FIG. 12 is an exemplary flow chart illustrating operation of the computing device to analyze RFID tag data to identify a termination zone.

FIG. 12 is an exemplary flow chart illustrating operation of the computing device to analyze RFID tag data to identify a termination zone. The process shown in FIG. 12 can be performed by a zone manager component, executing on a computing device, such as the computing device 102 in FIG. 1 or the computing device 302 in FIG. 3.

The process begins by obtaining RFID tag data from RFID tags in a location. The RFID tags include one or more RFID tags, such as, but not limited to, the plurality of RFID tags 120 in FIG. 1, the RFID tags 204 in FIG. 2 and/or the plurality of RFID tags 120 in FIG. 5. The zone detection component analyzes RFID tag data, item data and location data at 1204. The item data is data associated with one or more items, such as, but not limited to, the item data 126 in FIG. 1, FIG. 2 and/or FIG. 10. The location data is data describing the location and/or three-dimensional space containing the stationary RFID tags, such as, but not limited to, the location data 128 in FIG. 1, FIG. 2 and/or FIG. 10.

The zone detection component determines whether the set of RFID tags are stationary at 1206. If yes, the zone detection component determines whether the set of RFID tags are located outside an item display area at 1208. The item display area is an area associated with display or storage of items, such as, but not limited to, the item display area 620 in FIG. 6 and FIG. 8 and/or the designated item display area 704 in FIG. 7.

If the set of RFID tags are located outside the display area, the zone detection component determines whether the number of RFID tags in the set of RFID tags exceeds a threshold number at 1210. If yes, the zone detection component determines whether the set of RFID tags are stationary for a threshold time at 1212. If yes, the zone detection component determines whether the three-dimensional space associated with the location of the set of RFID tags is sufficient to contain the set of items corresponding to the set of RFID tags. If yes, the process returns to operation 1202. The zone manager component iteratively executes operations 1202 through 1214.

If a determination is made that the three-dimensional space associated with the location of the RFID tags is insufficient at 1214, the zone detection component identifies the location as a termination zone at 1216. The process terminates thereafter.

While the operations illustrated in FIG. 12 are performed by a computing device, aspects of the disclosure contemplate performance of the operations by other entities. In an example, a cloud service performs one or more of the operations.

Figure 13:
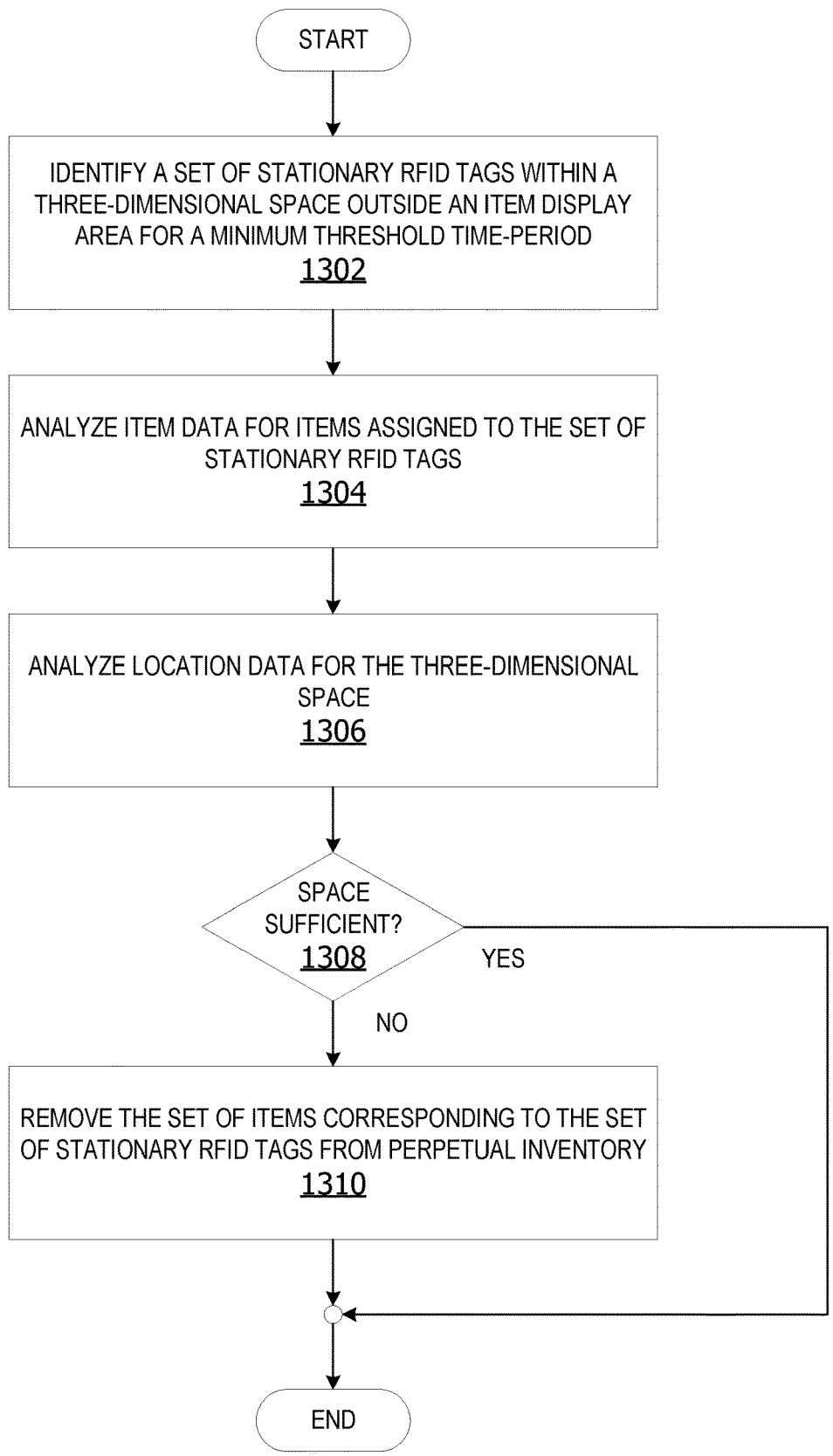
FIG. 13 is an exemplary flow chart illustrating operation of the computing device to update perpetual inventory (PI) based on identified termination zones.

FIG. 13 is an exemplary flow chart illustrating operation of the computing device to update perpetual inventory (PI) based on identified termination zones. The process shown in FIG. 13 can be performed by a zone manager component, executing on a computing device, such as the computing device 102 in FIG. 1 or the computing device 302 in FIG. 3.

The process begins by identifying a set of stationary RFID tags within a three-dimensional space outside an item display area for a minimum threshold time-period at 1302. The zone detection component analyzes the item data for items assigned to the set of stationary RFID tags at 1304. A zone detection component analyzes location data for the three-dimensional space at 1306. The zone detection component determines whether the three-dimensional space is sufficient to contain the set of items associated with the set of RFID tags at 1308. If yes, the process terminates thereafter.

If the space is not sufficient at 1308, an inventory manager component removes the set of items corresponding to the set of stationary RFID tags from perpetual inventory at 1310. The inventory manager is a component for updating perpetual inventory, such as, but not limited to, the inventory manager component 224 in FIG. 2. The process terminates thereafter.

While the operations illustrated in FIG. 13 are performed by a computing device, aspects of the disclosure contemplate performance of the operations by other entities. In an example, a cloud service performs one or more of the operations.

Additional Examples

In some examples, a system is provided for automatic reconciliation of perpetual inventory without human interaction. The system detects stationary RFID tags at a non-display location. The system identifies the location where the RFID tags are being sensed/detected as a termination zone based on associated item (product) and location data. The system performs inventory management using machine learning to auto-learn termination zones, determine how many RFID tags could fit in a space and/or how many RFID tags could fit at a location based on item dimension/size, space location, etc. The system determines how items fit into a space based on item dimensions/size and space locations to dynamically identify detached RFID tags in a termination zone.

In an example scenario, the system identifies a termination zone based on unusual item associations at a location. For example, if RFID tags within a location are associated with milk, ice cream, fountain pens, and shoes located in an electronics department, the system determines that it is unlikely this unusual grouping of unrelated items would be physically present and grouped together in the electronics department for the threshold time-period without being moved or removed by store personnel. Therefore, the system assumes these RFID tags are unattached to their associated items based on the identifications of the items and the unlikely combinations of the items, as well as the unusual location of the items. Thus, a single location containing a plurality of tags identified as unusual based on location or item association with that location is identified as a termination zone. Items associated with detached or "thrown away" RFID tags are purged from inventory to reconcile inventory.

In one example, if fifty RFID tags assigned to car tires are detected within a two-cubic foot space, the system recognizes that fifty tires could not fit within the two-cubic foot space. Therefore, the system assumes those tags have been thrown away and removes the fifty tires associated with those tags from inventory.

In other examples, the system tracks RFID tags to determine where tags are located, and items associated with the tags. If an RFID tags associated with a pair of jeans is removed from the jeans and the tag is dropped on the floor of the store, the system continues to read that RFID tag and show the jeans in current inventory even though the jeans are not physically present in the store. The system analyzes the RFID tag data, item data and location data to identify these removed RFID tags and delete items associated with removed RFID tags from inventory to reflect the fact that the jeans, and other items associated with removed tags, are no longer available in on-hand inventory. Items associated with RFID tags in an unusual location (located in trash heap) or an unusual compilation of RFID tags (collection of tags for mixed items that are not usually displayed or stored together) are removed from the perpetual inventory system.

In other examples, the system monitors RFID tag data to determine where RFID tags are collecting. The system analyzes data to determine where the tags enter the termination zone and when/where the tags leave the termination zone. For example, if all RFID tags are removed from the location during stocking/restocking of shelves, the system determines the location is not a termination zone but a temporary storage area for items prior to stocking. However, if the RFID tags are removed from the location at the same time as an area is cleaned (tags swept away), the system determines that the RFID tags are detached tags in a termination zone. RFID tags in the termination zone are filtered/ignored by the inventory system such that items associated with the RFID tags are not included in current inventory.

In one example, termination zones are dynamically changing. A location identified on a first day as a termination zone may not be a termination zone on a second day. In other words, termination zone locations, termination zone sizes/dimensions, and/or types of RFID tags within a termination zone change from day to day.

The system identifies a termination zone based on per-item criteria, such as, but not limited to, the concentration or density of RFID tags within a predetermined volume/area of space. If the number of items per known volume/area of space exceeds a threshold number of RFID tags for a given item, the system identifies that location as a termination zone and removes items associated with RFID tags in the termination zone from inventory for automatic PI correction. The system utilizes machine learning to dynamically adjust/reconfigure the threshold concentration, threshold number of tags, threshold number of items, and/or other per-item criteria for detection of termination zones. For example, a threshold number of items can be fifty RFID tags for a cubic foot of space. As the system learns, it can adjust the threshold number of tags down to forty tags, then down to thirty tags, and eventually stabilize the threshold minimum number of tags for a termination zone at five RFID tags per cubic foot.

The system can include video analytics in some examples. The video analytics detect when trash bags are taken out. If RFID tags in a location disappear from a monitored area when the trash is removed, the system learns that the location is a termination zone. Likewise, if the video analytics detect when items are restocked on shelves and the RFID tags in the location disappear from the location during restocking, the system learns that the location was not a termination zone.

Transaction data can also be used to verify locations of termination zones. The transaction data can also be used for theft/shrinkage detection. For example, if forty-five items are sold but fifty RFID tags associated with that type of items is taken out, the system can identify the loss or theft of five items.

In another example, the RFID tag data is data gathered at a store-level. However, termination zone data from two or more store locations can be utilized at a regional level for generating machine learning training data, improving per-item criteria, identifying termination zone patterns, identifying regional item shrinkage, etc.

In another example, the system self-corrects. If the system removes an item from inventory that is later identified on a shelf based on user input or scan data, the system autocorrects/updates inventory and adjusts the per-item criteria to prevent the same error from occurring again in the future.

Alternatively, or in addition to the other examples described herein, examples include any combination of the following:
  a set of image capture devices associated with the three-dimensional space within the item selection area generating image data associated with the plurality of RFID tags;
  a verification component, implemented on the at least one processor, that verifies the termination zone based on an analysis of the image data using item recognition analytics indicating an absence of the plurality of items within the three-dimensional space;
  the inventory manager component, implemented on the at least one processor, that updates the PI to add the at least one item to the PI on condition the at least one item is identified as physically present within the three-dimensional space based on the analysis of the image data;
  a notification component, implemented on the at least one processor, that sends a notification to a user to visually inspect the three-dimensional space for a presence of at least one item in the plurality of items within the three-dimensional space;
  a verification component, implemented on the at least one processor, that analyzes a response received from the user device verifying whether the at least one item in the plurality of items is physically present within the three-dimensional space;
  wherein the verification component verifies the three-dimensional space as a termination zone in response to receiving a confirmation of an absence of the at least one item within the three-dimensional space from the user device;
  the inventory manager component, implemented on the at least one processor, that updates the PI to add the at least one item to the PI on condition the response received from the user device confirms a presence of the at least one item within the three-dimensional space;

a set of point-of-sale (POS) devices generating transaction data associated with at least one item in the plurality of items;

a verification component, implemented on the at least one processor, that analyzes the transaction data to determine whether at least one item in the plurality of items is associated with a transaction after removal of the item from the PI;

the zone detection component, implemented on the at least one processor, that re-designates the three-dimensional space as a non-termination zone in response to determining an item associated with an RFID tag in the termination zone is scanned or purchased by a user during a transaction after removal of the item from PI, wherein the plurality of items in the termination zone are added back into the PI;

a set of scanner devices generating scan data identifying at least one item physically present within the item selection area;

the zone detection component, implemented on the at least one processor, that re-designates the three-dimensional space as a non-termination zone on condition the at least one item physically present within the item selection area is an item in the termination zone;

a machine learning component, implemented on the at least one processor, that analyzes feedback data, transaction data, and sensor data, including item scan data, using pattern recognition to update the set of per-item criteria in real-time;

wherein the set of per-item criteria further comprises at least one of a rate of item accumulation within the three-dimensional space, removal frequency for a set of RFID tags within the three-dimensional space, a minimum amount of space to accommodate a single item, or a maximum item concentration for a predetermined amount of space;

an analysis component, implemented on the at least one processor, that analyzes item data, including item dimensions, associated with each item in the plurality of items to determine whether the plurality of items fit within the three-dimensional space;

the zone detection component, implemented on the at least one processor, that determines plurality of RFID tags are unattached to the plurality of items and designates the three-dimensional space as the termination zone on condition the three-dimensional space is insufficient to accommodate the plurality of items based on the item dimensions and dimensions of the three-dimensional space;

removing, by an inventory manager component, the set of items associated with the set of stationary RFID tags from current on-hand inventory on condition the predetermined location is designated as the termination zone;

analyzing item data associated with the plurality of items and location data associated with the three-dimensional space using a set of termination zone criteria to determine whether the three-dimensional space is a termination zone;

identifying each tag in the set of stationary RFID tags as an unattached tag within an RFID tag termination zone on condition the three-dimensional space is identified as the termination zone;

analyzing, by a machine learning component, feedback, transaction data associated with the plurality of items, and item data using pattern recognition to generate an updated set of per-item criteria;

verifying, by a verification component, the predetermined location is a termination zone based on an analysis of sensor data obtained from a plurality of sensors associated with the predetermined location;

the plurality of sensors including at least one of an image capture device, and wherein the sensor data comprises at least one of image data associated with at least a portion of the predetermined location;

verifying, by a verification component, the predetermined location is a termination zone based on an analysis of feedback received from a user device associated with a user;

analyzing item data associated with a plurality of items corresponding to a plurality of stationary RFID tags and location data associated with a three-dimensional space containing the plurality of stationary RFID tags using a set of per-item criteria to determine whether the three-dimensional space qualifies as a termination zone;

the set of per-item criteria comprising threshold minimum number of items within a predetermined amount of space;

a tag management component, implemented on the at least one processor, that identifies the plurality of stationary RFID tags based on an analysis of RFID tag data associated with the plurality of RFID tag readers using a minimum threshold stationary time-period;

a feedback component, implemented on the at least one processor, that outputs a query to a user device associated with at least one user via the communications interface component, the query requesting feedback associated with presence of items within the termination zone;

a machine learning component, implemented on the at least one processor, that analyzes the feedback, transaction data, planogram data, restocking data, and inventory data to update the set of per-item criteria;

a zone detection component, implemented on the at least one processor, that identifies a termination zone including the plurality of stationary RFID tags based on an analysis of historical termination zone data associated with the item selection area, item data associated with a plurality of items assigned to the plurality of stationary RFID tags, and location data associated with the termination zone using a set of per-item criteria, the termination zone comprising a three-dimensional space located outside the item display area, the set of per-item criteria comprising a threshold minimum stationary time-period, the historical termination zone data comprising the item data and the location data associated with at least one prior termination zone;

a notification component, implemented on the at least one processor, that outputs a notification to a user device associated with a user assigning the user to perform a visual inspection of the three-dimensional space to confirm the plurality of items associated with the plurality of stationary RFID tags are physically absent from the termination zone; and wherein the plurality of sensor devices comprises at least one of a set of mobile robotic sensor devices, a set of weight sensor devices, a set of scanner devices, a set of image capture devices, and a set of pressure sensors.

At least a portion of the functionality of the various elements in FIG. 1, FIG. 2, FIG. 3, FIG. 4, FIG. 5, FIG. 6, FIG. 7, FIG. 8, FIG. 9 and FIG. 10 can be performed by other elements in FIG. 1, FIG. 2, FIG. 3, FIG. 4, FIG. 5, FIG. 6, FIG. 7, FIG. 8, FIG. 9 and FIG. 10 or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9 and FIG. 10.

In some examples, the operations illustrated in FIG. 11, FIG. 12 and FIG. 13 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for dynamic termination zone detection. For example, the elements illustrated in FIG. 1, FIG. 2, FIG. 3, FIG. 4, FIG. 5, FIG. 6, FIG. 7, FIG. 8, FIG. 9 and FIG. 10, such as when encoded to perform the operations illustrated in FIG. 11, FIG. 12 and FIG. 13, constitute exemplary means for analyzing RFID tag data obtained from a plurality of RFID tags associated with a plurality of items within an item selection area; exemplary means for identifying a set of RFID tags within the plurality of stationary RFID tags remaining within a predetermined location outside a designated item display area for a threshold minimum stationary time-period; exemplary means for analyzing item data associated with a set of items corresponding to the set of stationary MD tags, including dimensions of each item in the set of items, with a set of dimensions defining a three-dimensional space associated with the predetermined location to determine whether the three-dimensional space associated with the predetermined location is sufficient to accommodate the set of items; and exemplary means for designating the predetermined location as a termination zone on condition a number of items in the set of stationary RFID tags exceeds a minimum threshold number of items for the three-dimensional space and the three-dimensional space is incapable of accommodating the set of items. The set of dimensions can include, in some non-limiting examples, an x coordinate, a y-coordinate, and a z-coordinate.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for dynamic termination zone detection, the computer-implemented method comprising:
    analyzing, by a tag management component implemented on a processor, RFID tag data generated by a plurality of RFID tag readers obtained from a plurality of RPM tags within an item selection area;
    identifying, by the tag management component, a set of stationary MD tags within the plurality of RFID tags remaining within a predetermined location outside a designated item display area for a minimum threshold stationary time-period;
    triangulating, by a zone detection component implemented on the processor, the RFID tag data received from three or more of the plurality of RFID ta: readers;
    calculating, by the zone detection component, coordinates of the set of stationary RFID tags using the triangulated RFID tag data received from the three or more of the plurality of RFID tag readers;
    analyzing, by the zone detection component, item data associated with a set of items corresponding to the set of stationary RFID tags and location data associated with the predetermined location, including dimensions of each item in the set of items, with a set of dimensions defining a three-dimensional space associated with the predetermined location to determine whether the three-dimensional space associated with the predetermined location is sufficient to accommodate the set of items; and
    designating, by the zone detection component, the predetermined location as a termination zone on condition a number of items in the set of stationary RFID tags exceeds a minimum threshold number of items for the three-dimensional space and the three-dimensional space is insufficient to contain the set of items.

2. The computer-implemented method of claim 1, further comprising:
    removing, by an inventory manager component, the set of items associated with the set of stationary RFID tags from current on-hand inventory on condition the predetermined location is designated as the termination zone.

3. The computer-implemented method of claim 1, further comprising:
    analyzing the item data associated with a plurality of items corresponding to the plurality of stationary RFID tags and location data associated with the three-dimensional space using a set of per-item criteria to determine whether the three-dimensional space is the termination zone; and
    identifying each tag in the set of stationary RFID tags an unattached tag within the termination zone on condition the three-dimensional space is identified as the termination zone.

4. The computer-implemented method of claim 1, further comprising:
    analyzing, by a machine learning component, feedback, transaction data associated with at least one item corresponding to the plurality of stationary RFID tags, and the item data using pattern recognition to generate an updated set of per-item criteria.

5. The computer-implemented method of claim 1, further comprising:
    verifying, by a verification component, the predetermined location is the termination zone based on an analysis of sensor data obtained from a plurality of sensors associated with the predetermined location, the plurality of sensors comprising at least one of an image capture device, and wherein the sensor data comprises at least one of image data associated with at least a portion of the predetermined location.

6. The computer-implemented method of claim 1, further comprising:
    verifying, by a verification component, the predetermined location is the termination zone based on an analysis of feedback received from a user device associated with a user.

7. The computer-implemented method of claim 1, further comprising:
    analyzing the item data associated with a plurality of items corresponding to the plurality of stationary MD tags and location data associated with the three-dimensional space containing the plurality of stationary RFID tags using a set of per-item criteria to determine whether the three-dimensional space qualifies as the termination zone, the set of per-item criteria comprising the minimum threshold number of items within a predetermined amount of space.

8. A system for dynamic termination zone detection, the system comprising:
    a memory;
    a processor communicatively coupled to the memory;
    a plurality of sensor devices within an item selection area, the plurality of sensor devices comprising a plurality of MID tag readers generating RI FID tag data associated with a plurality of stationary RFID tags within an item display area;
    a zone detection component, implemented on the at least one processor, that:
    triangulates the RFID tag data received from three or more of the plurality of RFID tag readers,
    calculates coordinates of the plurality of stationary RFID tags using the triangulated RFID data,
    analyzes historical termination zone data associated with the item selection area,
    identifies a termination zone including the plurality of stationary RFID tags based on the analysis of the historical termination zone data, item data associated with a plurality of items assigned to the plurality of stationary RFID tags, and location data associated with the termination zone using a set of per-item criteria, the termination zone comprising a three-dimensional space located outside the item display area, the set of per-item criteria comprising a minimum threshold stationary time-period, the historical termination zone data comprising the item data and the location data associated with at least one prior termination zone, and the location data including the coordinates of the plurality of stations RFID tags; and an inventory manager component, implemented on the processor, that removes the plurality of items assigned to the plurality of stationary RFID tags from current inventory in real-time.

9. The system of claim 8, further comprising:

a tag management component, implemented on the at least one processor, that identifies the plurality of stationary RFID tags based on an analysis of RFID tag data obtained from the plurality of RFID tag readers using a minimum threshold stationary time-period.

10. The system of claim 8, further comprising:

a feedback component, implemented on the at least one processor, that outputs a query to a user device associated with at least one user via the communications interface component, the query requesting feedback associated with presence of items within the termination zone; and a machine learning component, implemented on the at least one processor, that analyzes the feedback, transaction data, planogram data, restocking data, and inventory data to update the set of per-item criteria.

11. The system of claim 8, further comprising:

a notification component, implemented on the at least one processor, that outputs a notification to a user device associated with a user assigning the user to perform a visual inspection of the three-dimensional space to confirm the plurality of items associated with the plurality of stationary MD tags are physically absent from the termination zone.

12. The system of claim 8, wherein the plurality of sensor devices comprises at least one of a set of mobile robotic sensor devices, a set of weight sensor devices, a set of barcode readers, a set of hand-held scanners, a set of image capture devices, and a set of pressure sensors.

13. A computer-implemented method for dynamic termination zone detection, the method comprising:

receiving, by a zone detection component implemented on a processor, RFID tag data from three or more of a plurality of RFID tag readers, the RFID tag data associated with a plurality of stationary RFID tags;

triangulating, by the zone detection component, the RFID tag data received;

calculating, by the zone detection component, coordinates of the plurality of stationary RFID tags using the triangulated RFID tag data;

analyzing, by the zone detection component, historical termination zone data associated with an item selection area;

identifying, by the zone detection component, a termination zone including the plurality of stationary RFID tags based on the analysis of the historical termination zone data associated with the item selection area, RFID tag data generated by a plurality of RFID tag readers within the item selection area, item data associated with a plurality of items assigned to the plurality of stationary RFID tags, and location data associated with the termination zone using a set of per-item criteria, the termination zone comprising a three-dimensional space, the set of per-item criteria comprising a minimum threshold stationary time-period, the historical termination zone data comprising the item data and the location data associated with at least one prior termination zone; and transmitting, by the zone detection component, the identified termination zone information to an inventory manager component that removes the plurality of items assigned to the plurality of stationary RFID tags from current inventory in real-time.

14. The method of claim 13, wherein the plurality of stationary RFID tags are identified based on an analysis of tag data obtained from the plurality of RFID tag readers using a minimum threshold stationary time-period.

15. The method of claim 13, further comprising:

outputting, by a feedback component implemented on the at least one processor, a query to a user device associated with at least one user via a communications interface component, the query requesting feedback associated with presence of items within the identified termination zone, wherein the feedback is analyzed along with transaction data, planogram data, restocking data, and inventory data using a machine learning component to update the set of per-item criteria.

16. The method of claim 13, further comprising:

outputting, by a notification component implemented on the at least one processor, a notification to a user device to direct a user to perform a visual inspection of the three-dimensional space to confirm the plurality of items associated with the plurality of stationary RFID tags are physically absent from the termination zone.

17. The method of claim 13, Wherein the identified termination zone further includes a plurality of sensor devices comprising at least one of a set of mobile robotic sensor devices, a set of weight sensor devices, a set of barcode readers, a set of hand-held scanners, a set of image capture devices, and a set of pressure sensors.

18. The method of claim 13, wherein the set of per-item criteria further comprises at least one of a rate of item accumulation within the three-dimensional space, removal frequency for a set of RED tags within the three-dimensional space, a minimum amount of space to accommodate a single item, or a maximum item concentration for a predetermined amount of space.

* * * * *

UNITED STATES PATENT AND TRADEMARK OFFICE
CERTIFICATE OF CORRECTION

PATENT NO. : 11,978,014 B2
APPLICATION NO. : 17/572998
DATED : May 7, 2024
INVENTOR(S) : Tingler et al.

It is certified that error appears in the above-identified patent and that said Letters Patent is hereby corrected as shown below:

In the Specification

Column 22, Line 48 – "MD" should be "RFID"

In the Claims

Column 23, Line 31 – "RPM" should be "RFID"

Column 23, Line 34 – "MD" should be "RFID"

Column 23, Line 40 – "ta:" should be "tag"

Column 24, Line 37 – "MD" should be "RFID"

Column 24, Line 51 – "MID" should be "RFID"

Column 24, Line 51 – "RI FID" should be "RFID"

Column 25, Line 36 – "MD" should be "RFID"

Column 26, Line 23 – "tag data obtained" should be "RFID tag data obtained"

Column 26, Line 51 – "RED" should be "RFID"

Signed and Sealed this
Eleventh Day of June, 2024

Katherine Kelly Vidal
*Director of the United States Patent and Trademark Office*